United States Patent
Chu et al.

(10) Patent No.: US 6,885,978 B2
(45) Date of Patent: Apr. 26, 2005

(54) AUTO-DETERMINATION OF DTE/DCE CONNECTION

(75) Inventors: Steve Chu, San Francisco, CA (US); Jicheng Ye, Cupertino, CA (US); George C. Yu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 10/394,090

(22) Filed: Mar. 19, 2003

(65) Prior Publication Data

US 2004/0186689 A1 Sep. 23, 2004

(51) Int. Cl.⁷ .............................................. G06F 15/00
(52) U.S. Cl. ...................................... 702/186; 710/305
(58) Field of Search .............................. 702/64, 65, 83, 702/118–124, 183, 186, 188, 189; 710/305; 375/219, 220, 222; 439/638

(56) References Cited

U.S. PATENT DOCUMENTS

| | | | |
|---|---|---|---|
| 5,247,540 A | * 9/1993 | Hoge | 375/220 |
| 5,555,545 A | * 9/1996 | Yang | 375/220 |
| 5,633,890 A | * 5/1997 | Ahmed | 375/219 |
| 5,657,345 A | * 8/1997 | Lazaridis | 375/222 |
| 5,761,463 A | * 6/1998 | Allen | 710/305 |
| 5,909,464 A | 6/1999 | Cohen et al. | |
| 6,088,754 A | 7/2000 | Chapman | |
| 6,151,653 A | * 11/2000 | Lin et al. | 710/305 |
| 6,223,089 B1 | * 4/2001 | Page | 700/9 |
| 6,301,633 B1 | * 10/2001 | Chapman | 710/305 |
| 6,554,650 B2 | * 4/2003 | Kayworth et al. | 439/638 |

OTHER PUBLICATIONS

Hoole, A.C.F., et al, "The Design of an Integrated Circuit for Use in a Smart RS–232 Cable," Session 11D1, IEEE Proceedings 1989 Southeastcon, pp. 786–790.

SeaChange Date Sheet C1: Serial Adaptor [online], Jun. 1998, SeaChange, 8 Horsted Square, Bell Lane Business Park, Uckfield, East Sussex TN22 1QQ, retrieved from the internet on Mar. 18, 2003: <URL:http://www.smartkontrols.co.uk/data/p/com/sit_data_clissl.pdf>.

5930/5935 ADSL Business Gateways [online], Sep. 2002, Efficient Networks, Inc. A Siemens Company, 4849 Alpha Road, Dallas, TX 75244, retrieved from the internet on Mar. 18, 2003: <URL:http://www.efficient.com/pdf/efficientnetworks–5930.pdf>.

Routers—Configuring Dial–backup via Web GUI, retrieved from the internet on Feb. 17, 2003: <URL:http://kb.efficient.com/al/273/207/28704.html>.

Unable to communicate with my router via the console port, retrieved from the internet on Feb. 17, 2003: <URL:http://kb.efficient.com/al/273/207/22728.html>.

\* cited by examiner

Primary Examiner—Marc S. Hoff
(74) Attorney, Agent, or Firm—Charles E. Krueger

(57) ABSTRACT

An auto-determination technique detects whether a DTE or DCE is connected to an RS232 port. The port is then automatically configured to interface with the connected equipment.

10 Claims, 2 Drawing Sheets

AUTO-DETERMINATION OF DTE/DCE CONNECTION

BACKGROUND OF THE INVENTION

Many devices utilize a serial RS232 port as a serial interface. RS232 describes the standard for serial data communication between PCs and peripheral devices, such as modems, mice etc. and between PCs. There are two kinds of devices (from the viewpoint of RS232 communication): DTE and DCE. DTE stands for Data Terminal Equipment and means the "terminal devices", i.e. the PC or a simple terminal and DCE stands for Data Communication Equipment, i.e. modems, mobile phones etc.

For example, network devices, such as routing platforms, often utilize a serial RS232 port to interface with the console, which is a DTE. To be able to support a backup WAN link usually requires the use of an auxiliary port to connect with an external modem which is a DCE.

A set of signals are defined for the serial RS232 port. The important signals in the present context are DTR (Date Terminal Ready) asserted by the console; DSR (Data Set Ready) asserted by the modem in answer to DTR; RTS (Request to Send) asserted by the sender; and, CTS (Clear to Send) asserted by receiver in answer to RTS.

To establish a DTE to DTE connection a special cable is used where RTS and CTS are electrically connected.

At the initialization of a connection the DTR and DSR lines are utilized as follows:

DTR/DSR: These control lines assure that there are really two devices present which want to communicate with each other: First, the DTE asserts DTR, then the DCE answers asserting DSR.

During a data transfer the RTS and CTS lines are used as follows:

RTS/CTS: These are the actual flow control lines: The sender asserts RTS (ready to send), the receiver answers asserting CTS (clear to send). If the receiver needs a pause (buffer overflow, for example), it de-asserts CTS, so the sender knows it has to wait with further transmission until the receiver has asserted CTS. This way it is assured that no data is lost.

In some systems, an alternate way of accessing the routing platform command line interface is through telnet. If for whatever reason, if the telnet option fails, the user is required to perform recovery techniques to access the router configuration.

Because port space on a device is usually a scarce resource, there is a need to use a single RS232 port for console and auxiliary port functions. In current devices, a user needs to manually configure the RS232 port to function as either the console or the auxiliary mode. Once the RS232 port has been configured to the auxiliary mode, a user is locked out of the router CLI command line interface. Thus, if the single serial RS232 port has been configured to support a modem and both the modem and telnet links are non-functional the user can be prevented from reconfiguring the routing platform.

Accordingly, an improved serial interface for network devices and other devices is required.

BRIEF SUMMARY OF THE INVENTION

In a first embodiment of the invention, a routing platform implements an automatic modem/console detection algorithm so that it can utilize a single serial port to communicate to a serial modem as well as a console terminal without user intervention and to inform the hardware/software of the routing platform about the device that is newly connected.

In another embodiment of invention, the automatic modem/console discovery algorithm is used to prevent the router being locked up from the user when the RS232 console port has been enabled for backup dialup use. With auto-detection of whether a modem or a computer terminal is connected to the routing platform, the console session can be resumed once a computer terminal is auto-detected and vice versa.

In another embodiment, a state machine is implemented that responds to the connection or disconnection of a device to the serial RS232 port to change states. When no device is connected the state machine is in a first state. If a DCE is connected the state machine transitions from the first state to a second state. When the DCE is disconnected the state machine transitions from the second state back to the first state. If a DTE is connected the state machine transitions from the first state to a third state. When the DTE is disconnected the state machine transitions from the third state back to the first state.

In another embodiment of the invention, the state machine monitors the DSR and CTS RS232 signals and transitions based on whether these signals are asserted or de-asserted when a device is connected or disconnected.

In another embodiment of the invention, based on whether the DCE or DTE is auto-detected, the correct software is executed to support an interface with the connected device.

Other features and advantages will now be apparent in view of the following detailed description and appended claims.

DETAILED DESCRIPTION OF THE INVENTION

Reference will now be made in detail to various embodiments of the invention. Examples of the these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks.

Figure 1:
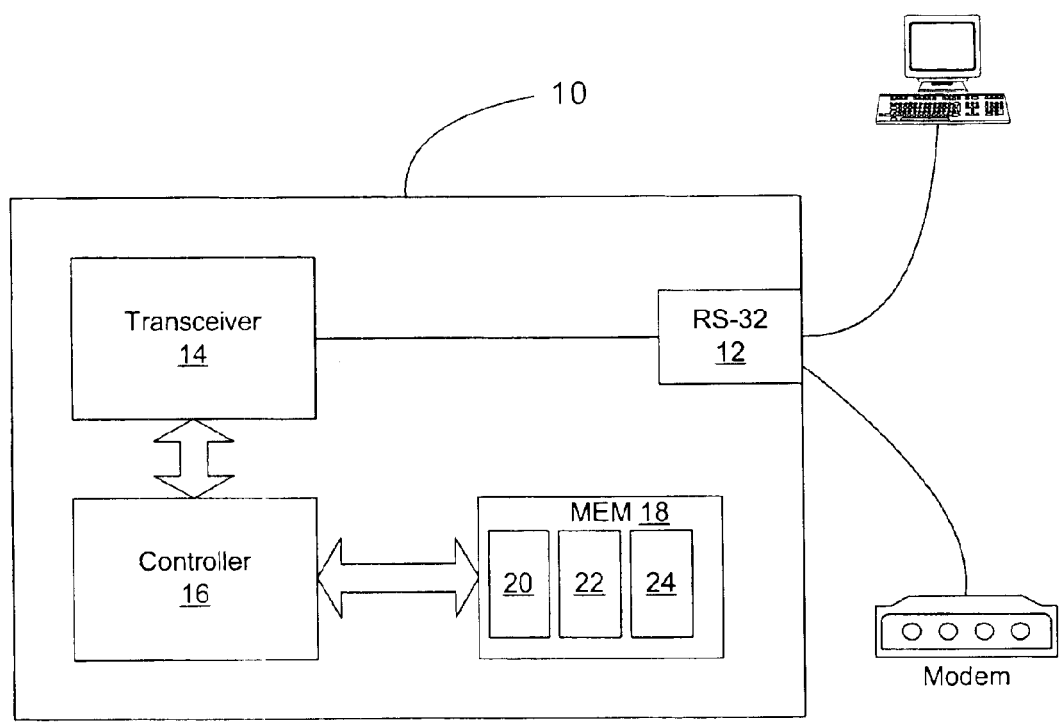
FIG. 1 is a block diagram of a device implementing an embodiment of the invention.

In a first embodiment of the present invention, as depicted in FIG. 1, a device is configured with a single serial RS232 port and logic for automatically detecting whether a DTE or DCE is connected. In addition, when utilized in a routing platform the logic automatically launches the correct software required to support either a console (DTE) or modem (DCE) connection.

Referring to FIG. 1, a network device 10 includes a serial RS232 port 12 coupled to a transceiver 14. The transceiver 14 is coupled to a controller 16 which is coupled to a memory device 18. The memory device 18 is schematically depicted as holding software routines for performing auto-detection procedures, supporting a console interface, and supporting a modem interface 20, 22, 24 respectively.

The auto-detection procedures will now be described with reference to the state diagram of FIG. 2. The state machine is implemented by the controller executing software stored in the memory and indicated above as the auto-detection procedures 20. The controller interacts with the transceiver which transmits and receives signals from the serial RS232 port.

Figure 2:
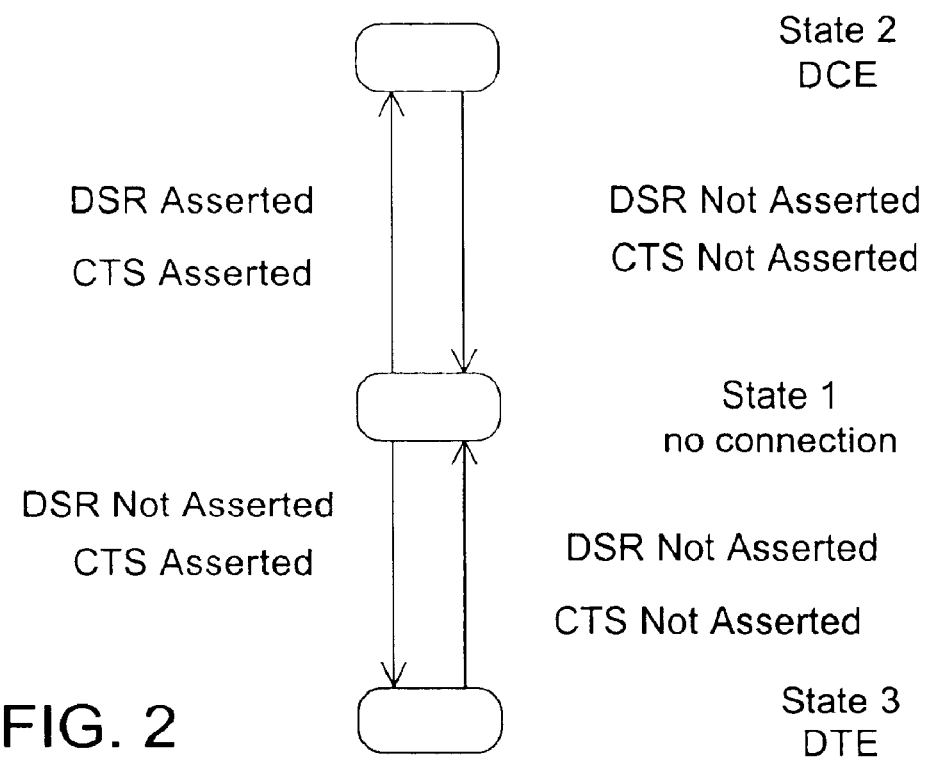
FIG. 2 is a state diagram of an embodiment of the invention.

Referring now to FIG. 2, when no cable is connected to the serial RS232 port, neither of the DSR and CTS signals are asserted. This is state 1 of the state machine.

If a cable connects a DCE, such as a modem, to the serial RS232 port then, as described above, DSR and CTS are asserted by the modem and an interrupt is generated. The auto-detection procedure 20 responds to the interrupt by checking the signals on DSR and CTS. In this case, both signals are asserted and the state machine transitions to State 2.

When the cable is disconnected from the modem the DSR and CTS signals are de-asserted and an interrupt is generated. The auto-detection procedure 20 responds to the interrupt by checking the signals on DSR and CTS. In this case, both signals are not asserted and the state machine transitions to State 1.

If a cable connects a DTE, such as a console, to the serial RS232 port then, as described above, DSR is not asserted and CTS is asserted and an interrupt is generated. An auto-detection procedure 20 responds to the interrupt by checking the signals on DSR and CTS. In this case, the signal DSR is not asserted and CTS is asserted and the state machine transitions to State 3.

When the cable from the DTE is disconnected the DSR and CTS signals are de-asserted and an interrupt is generated. An auto-detection procedure 20 responds to the interrupt by checking the signals on DSR and CTS. In this case, both signals are not asserted and the state machine transitions to State 1.

In summary: State 1=cable unplugged; State 2=modem attached; and State 3=console attached.

An important aspect of the present embodiment is the DSR and CTS are only sampled initially when a device is connected to or disconnected from the RS232 port. If these signals change between the time a device is connected and disconnected no transition in state will occur.

Figure 3:
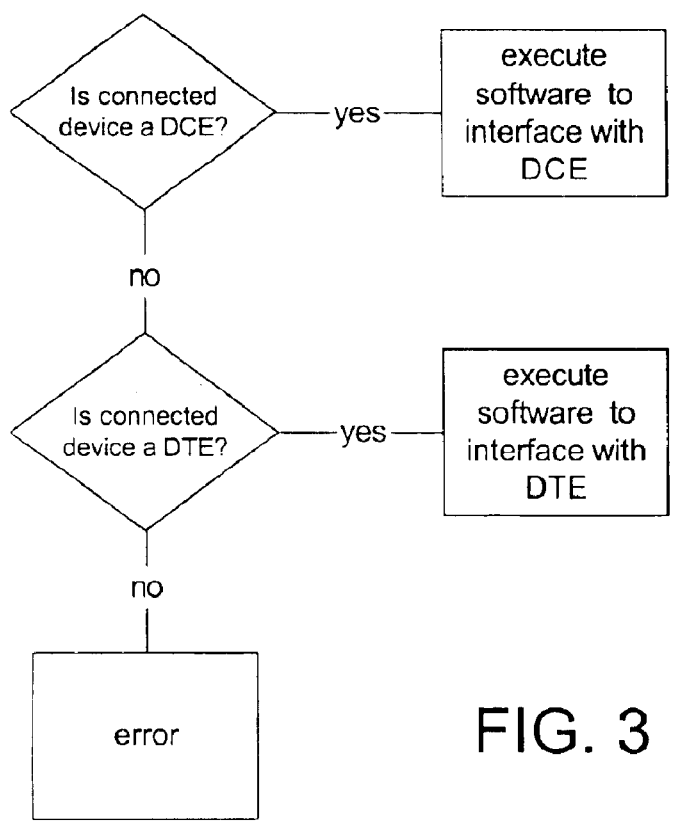
FIG. 3 is a flow chart depicting steps of launching the correct interface software.

Another feature of this embodiment is that subsequent to auto-detection the correct routines are launched to service the device connected. As set forth in the flow chart of FIG. 3, if a DTE is detected as connected through the serial RS232 port then the routines for interfacing with the console 22 are executed by the controller. On the other hand, if a DCE is detected as connected through the serial RS232 port then the routines for interfacing with modem 24 are executed by the controller.

Accordingly, the lockout problem of the existing systems described above is avoided. If a modem connected to the serial RS232 port ceases to function the modem needs only to be disconnected and the console connected to the serial RS232 port. The auto-detect routine will detect that the console is connected and will cause the controller to executed the routines for interfacing with the console.

The invention has now been described with reference to the preferred embodiments. Alternatives and substitutions will now be apparent to persons of ordinary skill in the art. In particular, although the state machine has been described as being implemented in software various combinations of hardware and software may be utilized as is well known in the art. Thus parts of the invention may be implemented as program code, stored on a computer readable medium, that is executed by a digital computer. The computer readable medium may include, among other things, magnetic media, optical media, electro-magnetic fields encoding digital information, and so on. Further, the utility of the invention is not limited to routing platforms but can be used in any device requiring a single RS232 port connect to either a DTE or a DCE. Accordingly, it is not intended to limit the invention except as provided by the appended claims.

What is claimed is:

1. A method for determining whether a DTE or DCE is being connected with an RS232 serial port, where the RS232 interface includes DSR (Data Set Ready) and CTS (Clear to Send), said method comprising the steps of:

providing a state machine having first, second, and third states;

sampling the DSR and CTS signals only when a device is connected to or disconnected from the RS232 port;

if the DSR and CTS are both non-asserted, transitioning to the first state that indicates no device is connected to the RS232 port;

if the DSR and CTS are both asserted, transitioning from the first state to a second state indicating that a DCE is connected to the RS232 port; and if the DSR is non-asserted and the CTS is asserted, transitioning from the first state to a third state indicating that a DTE is connected to the RS232 port.

2. The method of claim 1 further comprising the steps of:

if the state machine transitions to the second state, executing software for interfacing with a DCE; and if the state machine transitions to the third state, executing software for interfacing with a DTE.

3. The method of claim 1 where the RS232 port is an interface to a routing platform and further comprising the steps of:

if a DTE in the form of a console is connected to the RS232 port, executing software for interfacing with the console when the state machine transitions to the third state;

if a DCE in the form of a modem is connected to the RS232 port, executing software for interfacing with the modem when the state machine transitions to the third state.

4. A system for determining whether a DTE or DCE is being connected with an RS232 serial port, where the RS232 interface includes DSR (Data Set Ready) and CTS (Clear to Send), said system comprising:

means for implementing a state machine having first, second, and third states;

means for sampling the DSR and CTS signals only when a device is connected to or disconnected from the RS232 port;

means for transitioning from the second state or the third state to the first state that indicates no device is connected to the RS232 port if the DSR and CTS are both non-asserted;

means for transitioning from the first state to a second state indicating that a DCE is connected to the RS232 port if the DSR and CTS are both asserted; and means for transitioning from the first state to a third state indicating that a DTE is connected to the RS232 port if the DSR is non-asserted and the CTS is asserted.

5. The system of claim 4 further comprising:

means for executing software for interfacing with a DCE if the state machine transitions to the second state; and means for executing software for interfacing with a DTE if the state machine transitions to the third state.

6. The system of claim 5 where the RS232 port is an interface to a routing platform and further comprising:

means for executing software for interfacing with the console when the state machine transitions to the third state if a DTE in the form of a console is connected to the RS232 port;

means for executing software for interfacing with the modem when the state machine transitions to the second state if a DCE in the form of a modem is connected to the RS232 port.

7. A computer program product for use on a system including a digital controller that implements an auto-detection system, the computer program product comprising:

a computer usable medium having computer readable program code physically embodied therein, said computer program product further comprising:

computer readable program code for causing the controller to implement a state machine having first, second, and third states;

computer readable program code for causing the controller to sample the DSR and CTS signals only when a device is connected to or disconnected from the RS232 port;

computer readable program code for causing the controller to transition to the first state that indicates no device is connected to the RS232 port if the DSR and CTS are both non-asserted;

computer readable program code for causing the controller to transition from the first state to a second state indicating that a DCE is connected to the RS232 port if the DSR and CTS are both asserted; and computer readable program code for causing the controller to transition from the first state to a third state indicating that a DTE is connected to the RS232 port if the DSR is non-asserted and the CTS is asserted.

8. The computer program product of claim 7 further comprising:

computer readable program code for causing the controller to execute software for interfacing with a DCE if the state machine transitions to the second state; and computer readable program code for causing the controller to execute software for interfacing with a DTE if the state machine transitions to the third state.

9. The computer program product of claim 7 where the RS232 port is an interface to a routing platform and further comprising:

computer readable program code for causing the controller to execute software for interfacing with the console when the state machine transitions to the third state if a DTE in the form of a console is connected to the RS232 port;

computer readable program code for causing the controller to execute software for interfacing with the modem when the state machine transitions to the third state if a DCE in the form of a modem is connected to the RS232 port.

10. A system for automatically determining whether a DTE or DCE is being connected with an RS232 serial port, where the RS232 interface includes DSR (Data Set Ready) and CTS (Clear to Send, said system comprising:

a controller coupled to monitor the DSR and CTS pins of the RS232 serial port;

a memory holding auto-detection code;

where, when executing the auto-detection code, the controller implements a state machine that samples the DSR and CTS signals only when a device is connected to or disconnected from the RS232 port; and if the DSR and CTS are both non-asserted then transitions to the state machine first state that indicates no device is connected to the RS232 port; or if the DSR and CTS are both asserted then transitions the state machine from the first state to a second state indicating that a DCE is connected to the RS232 port; or if the DSR is non-asserted and the CTS is asserted then transitioning from the first state to a third state indicating that a DTE is connected to the RS232 port.

* * * * *